(12) United States Patent
Gesuita et al.

(10) Patent No.: US 6,833,514 B2
(45) Date of Patent: Dec. 21, 2004

(54) CONTROL SYSTEM FOR MULTIHEAD WEIGHER

(76) Inventors: Enzo Gesuita, Via Pascoli 10, 35030 Selvazzano Dentro, Padova (IT); Francesco Gusson, Via Montebello 10, 35010 Vigonza, Padova (IT)

( * ) Notice: Subject to any disclaimer, the term of this patent is extended or adjusted under 35 U.S.C. 154(b) by 0 days.

(21) Appl. No.: 10/430,134

(22) Filed: May 6, 2003

(65) Prior Publication Data

US 2003/0205413 A1 Nov. 6, 2003

Related U.S. Application Data

(62) Division of application No. 09/705,359, filed on Nov. 3, 2000, now Pat. No. 6,566,613.

(51) Int. Cl.[7] .............................................. G01G 19/387
(52) U.S. Cl. .................................................. 177/25.18
(58) Field of Search ...................................... 177/25.18

(56) References Cited

U.S. PATENT DOCUMENTS

| 4,658,919 A | * | 4/1987 | Nobutsugu ..................... 177/1 |
| 4,733,363 A | * | 3/1988 | Yamada et al. ............. 700/305 |
| 6,046,411 A | * | 4/2000 | Kawanishi et al. ...... 177/25.13 |
| 6,566,613 B1 | * | 5/2003 | Gesuita et al. ........... 177/25.18 |

* cited by examiner

Primary Examiner—Randy W. Gibson
(74) Attorney, Agent, or Firm—Peter J. Phillips; Cooper & Dunham LLP

(57) ABSTRACT

A control system for a multihead weigher for a combinatorial weighing system comprises a plurality of weighing modules each having a weighing bucket for receiving and weighing articles to be weighed, and a weighing module controller (e.g., a state machine) for controlling article weighing, discharge and refill operations of its associated weighing bucket. A central control unit (e.g., a PC) connected to the weighing module controllers over a low speed serial network issues at least one macro-command, such as "discharge and refill" to the weighing module controllers reducing the number of commands issued from central control unit to the weighing module controller which would otherwise occur without the macro-command. The weighing module controllers, in response to the at least one macro-command, perform the steps needed to effect the article weighing, discharge and refill operations. The control system has Internet connection capabilities.

2 Claims, 6 Drawing Sheets

CONTROL SYSTEM FOR MULTIHEAD WEIGHER

CROSS-REFERENCE TO RELATED APPLICATION

This application is a division of U.S. Ser. No. 09/705,359, filed Nov. 3, 2000 now U.S. Pat. No. 6,566,613.

BACKGROUND OF THE INVENTION

1. Field of the Invention

The present invention relates to a control system for a high-speed multihead weigher, sometimes called simply a weigher. The multihead weigher is a combinatorial weighing system composed of a series of completely independent weighing modules, called heads, connected to a so called central control unit, composed of a common personal computer (PC) or the like, by means of a low-speed serial network.

2. Description of the Related Art

Generally a combinatorial weighing system is composed of a set of identical modules, each equipped with its own vibrating channel, a loading bucket, a weighing bucket coupled with a load cell or the like and may include a memory bucket. A typical realization of a combination weighing system foresees that these modules are placed according to a circular configuration, even if also other types of configurations are possible, for example a rectilinear one. As will be understood by those skilled in the field of combinatorial weighers, in case of circular configuration the product or articles is delivered radially starting from the machine center, the buckets of each module are filled and the product in the weighing buckets is weighed. The combination of the weights contained in the weighing buckets of the modules that comes closest to the required weight is discharged in a transfer device, for example a cone or a funnel, which conveys the product towards a packaging system.

The electromechanical members with which each module is equipped are the motors for the motion of the buckets, the electromagnets in order to drive the vibrating channels and the load cells to weigh the product inside the weighing buckets. In order to describe the prior art in relation to the control of these electromechanical devices two complementary solutions will be mentioned.

U.S. Pat. No. 4,694,920 to Naito et al. relates to a combinatorial weigher having a control system composed of at least three central processing units which control respectively the acquisition of the electric signals coming out from the load cells (said weight-monitoring section), the devices for the motion of the product to be weighed such as motors and vibrating feeders (said drive-control section) and the digital signals for the selection of the weights combination to be discharged (said main section). As the electromechanical members are distributed on a circular structure whose dimensions are not negligible, there is an evident necessity to reach said devices with some cables starting from a unit which is physically dislocated far from them. The cables are the cause of an increase of the general system costs and are a potential source of malfunction due to possible disconnections. Besides, the presence of cables, whose length is not negligible, for the feeding of motors and electromagnets generates electromagnetic interferences, which can cause malfunctions of the electronic systems incorporated in the machine, as partially pointed out in the U.S. Pat. No. 4,658,919 to Nobutsugu.

U.S. Pat. No. 5,981,881 to Kawanishi et al relates to another architecture, wherein the control system of the machine is composed of a single weighing control unit which is connected through a high-speed local area network (LAN) to the weighing modules. Each module contains some electromechanical members with relative electric drivers and interfaces itself with the LAN through a LAN interface. In this case the previously mentioned problems that accompany use of cables, namely (1) increased cost (2) malfunction due to possible misconnections, and (3) presence of electromagnetic interference, do not exist. However, if a LAN is used, it needs to be a high-speed LAN because the weighing control unit can manage all the weighing modules and can therefore respond quickly to data such as operating conditions or control information between the weighing control unit and the weighing modules. When the number of weighing modules and the machine speed (weights/minute) increase, the quantity of information exchanged between the generic control unit and the peripheral modules increases considerably. In order to allow to the central unit a rapid control of the peripheral members such as motors, vibrating channels, load cells, etc., it is necessary to use a high-speed communication network, such as a LAN. The patent states that the use of a high-speed LAN allows the upgrade of software memorized in the modules control electronics. The prior art mentioned in this patent states clearly that, if the weighing driving sections are connected to the weighing control unit through an ordinary serial telecommunication line, it is impossible for the weighing system to reach high operating speed in terms of weights/minute.

The use of a high speed LAN reveals itself expensive if compared to the simplest serial asynchronous low-speed communication lines used for example in a common PC or similar apparatus. In a typical industrial environment the electromagnetic pollution level is rather high and the presence of electromagnetic interferences can considerably reduce the reliability of a high-speed communication system such as a LAN, causing an increase of the error probability. In general the more such decrease in reliability is marked, the higher the transmission speed of the data. In particularly demanding situations the lack of a reliable link between the central unit and the peripheral modules of the weigher, because of frequent communication errors, can determine an undesired reduction of the weigher working speed. The patent also discusses insertion of electro-optical converters in the communication interfaces, or in the introduction of optical fiber sections inside the network. However, this results in an increase in the hardware complexity and a further increase of costs.

In order to manage a combinatorial weigher there is the necessity of some fundamental functional blocks or electronic subsystems, such as a unit for the calculation of the combinations, a graphic or alphanumerical unit for the input/output of data, a section for the storage of data and programs and a communication interface with the weighing peripheral modules. In some cases these electronic subsystems are placed in different points inside the weigher, while in other cases instead they are dislocated and interconnected with each other in a single housing of the weigher called central control unit. The central control unit is therefore generally composed of a multiplicity of electronic subsystems conceived as intrinsically independent, with definite and separate functions, which together carry out the requested control functions. The disadvantages of such a custom-made architecture appear evident if the possible cost reductions and the decrease of structural complexity are considered. This approach results in high costs due to the design and manufacture of separate subsystems, and loss of reliability due to possible misconnection of the subsystems.

Also the weighing modules are characterized by a set of electronic subsystems such as motor drivers, vibrating feeders electromagnet drivers, calculation digital units and communication interfaces. A critical point as far as the reliability of the weighing modules is concerned consists in a considerable quantity of cables which interconnects the mentioned electronic subsystems. These connections raise the cost of a weighing module and can determine malfunctions due to accidental disconnections.

Often there is the problem of integrating a weighing system in the factory network that controls the industrial plants. Sometimes the possibility to monitor or control a weighing system from a geographically remote place is requested. The above mentioned custom-made control units are generally not set up for this type of application and need hardware expansion modules such as modem or additional LAN interfaces, with consequent increase of the costs and of the system hardware complexity. Also, communication through telephonic public network between the central control unit and a remote controller located in perhaps a different country or continent has often very high costs. For this reason the control and monitoring functions of one or more weighing systems from a geographically remote place cannot be active for an indeterminate time.

SUMMARY OF THE INVENTION

In order to address the above mentioned problems of the prior art, it is an object of the present invention to provide a combinatorial weighing high-speed system, said multihead weigher, comprising a PC or the like that carries out all the functions of a central control unit and which is connected to the weighing peripheral modules only through its own low-speed serial port.

Each weighing peripheral module is run by its single board weighing module controller installed near the electromechanical members of the head. The single board weighing module controllers are connected to each other only through a low-speed serial network linked to the serial port of the central control unit.

The invention addresses the problem stated in the prior art that correlated the maximum working speed of a combinatorial weigher with the transmission speed of the communication network. The use of a high-speed LAN or the like is not necessary due to the implementation of a finite state machine, sometimes called automaton, on each single board weighing module controller.

Such finite state automatons, are able to process the macro-commands sent by the central control unit to the single board weighing module controller through the low-speed serial network. The necessity of a high transmission speed is not needed because with a single macro-command it is possible to let an automaton of a generic single board weighing module controller carry out a sequence of separate operations, which as alternative would have been carried out individually, each answering to a specific command of its own transmitted by the central control unit to the generic weighing control unit. The low transmission speed of the data added to the simplicity of the hardware used for the communication allows a relevant reduction of costs and provides an excellent reliability of the transmission even in the presence of strong electromagnetic interferences.

The use of an architecture composed of a plurality of single board weighing module controllers, each placed near the relative electromechanical members to be driven and connected through a common low-speed serial network to the central control unit in daisy chain configuration, allows the minimization of the number of electric connections present in the multihead weigher. The minimization of the number of electric connections has, as favorable consequences, a relevant reduction of costs, an increase of the system intrinsic reliability, as well as a decrease of the electromagnetic emissions associated to the cables for the feeding of motors and electromagnets. The number of the weighing modules run by the central control unit can be easily increased by simply connecting further weighing modules to the low-speed serial network.

The use of a PC or the like in order to carry out the functions of a central control unit allows to realize a control system which integrates in a single electronic card the unit for the calculation of the combinations, a driver for an LCD monitor or the like equipped with a touch-screen graphic interface for the input/output of the data, the data storage unit and the low-speed asynchronous serial port. Such architecture addresses the problems mentioned in the prior art. The presence of a PC or the like as a multihead weigher central control unit allows its connection to Internet for the remote control on a world scale at low costs. Therefore, the multihead weigher could be permanently connected, 24 hours a day, to Internet for aims of remote control, of production data monitoring or remote assistance by the manufacturer.

To be able to have a PC or the like as a central control unit allows the multihead weigher to be easily connected to a local computer system for the management of an industrial plant, such as a factory network, and therefore, for example, to be able to control a plurality of multihead weighers from a single control room, which is often desired or required in weighing and packaging plants.

Having a PC or similar apparatus, realized with a single electronic card and conceived for industrial control applications, allows a modem for easy connection to a public communication network (fixed or mobile) and an interface for the connection to a computer network.

According to one aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one macro-command, wherein each of said weighing module controllers controls its weighing module to perform article weighing, discharge and refill operations in response to said at least one macro-command, to thereby reduce the number of commands issued from central control unit to the weighing module controller which would otherwise occur without the macro-command.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected over a low speed serial network to the plurality of weighing module controllers for controlling the weighing module controllers by issuing at least one macro-command, wherein each of said weighing module controllers controls its respective weighing module to perform article weighing, discharge and refill operations in response to said at least one macro-command, to thereby reduce the number of commands issued from central control unit to the weighing module controller which would otherwise occur without the macro-command.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, each weighing module controller consisting essentially of a single board.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a general purpose computer connected to the plurality of weighing module controllers for controlling the weighing module controllers by issuing at least one macro-command, wherein each of said weighing module controllers controls its weighing module to perform article weighing, discharge and refill operations in response to said macro-command, to thereby reduce the number of commands issued from central control unit to the weighing module controller which would otherwise occur without the macro-command.

According to another aspect of the invention a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, wherein each of said weighing module controllers controls its weighing module to perform article weighing, discharge and refill operations in response to said at least one command, and a remote control unit, connected to the central control unit, for controlling the issuance of at least one command from the central control unit.

According to another aspect of the invention a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, wherein each of said weighing module controllers controls its weighing module to perform article weighing, discharge and refill operations in response to said at least one command, and a remote control unit, connected to the central control unit over Internet, for controlling the issuance of at least one command from the central control unit.

According to another aspect of the invention, a control system for a combinatorial weigher system is provided, comprising a plurality of combinatorial weighers, each comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, and wherein each of said weighing module controllers controls its respective weighing module to perform article weighing, discharge and refill operations in response to said at least one command, and wherein one of said central control units of said plurality of combinatorial weighers is a supervisor control unit which controls the remaining central control units of the plurality.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, wherein each of said weighing module controllers controls its weighing module to perform article weighing, discharge and refill operations in response to said at least one command and.a remote control unit, connected to the central control unit, for controlling the issuance of at least one macro-command from the central control unit.

According to another aspect of the invention, a control system for a combinatorial weigher is provided, comprising an article weigher for weighing articles and forming articles into batches to be packaged, a feeder for supplying articles to be weighed to the article weigher, a packing station for packing the batches of weighed articles into packages, a packer interface for controlling the supply of articles supplied by the feeder to the article weigher and for controlling delivery of the batches of weighed articles from the article weigher to the packing station, and a central control unit connected to said packer interface through a low speed serial network, said central control unit issuing to said packer interface at least one command indicating the delivery to the packing station of a package to be filled, in response to which command the packer interface controls delivery of a batch of weighed articles to the packing station.

Other objects and advantages will appear from the following figures, detailed description and appended claims.

DETAILED DESCRIPTION OF THE PREFERRED EMBODIMENT

Figure 1:
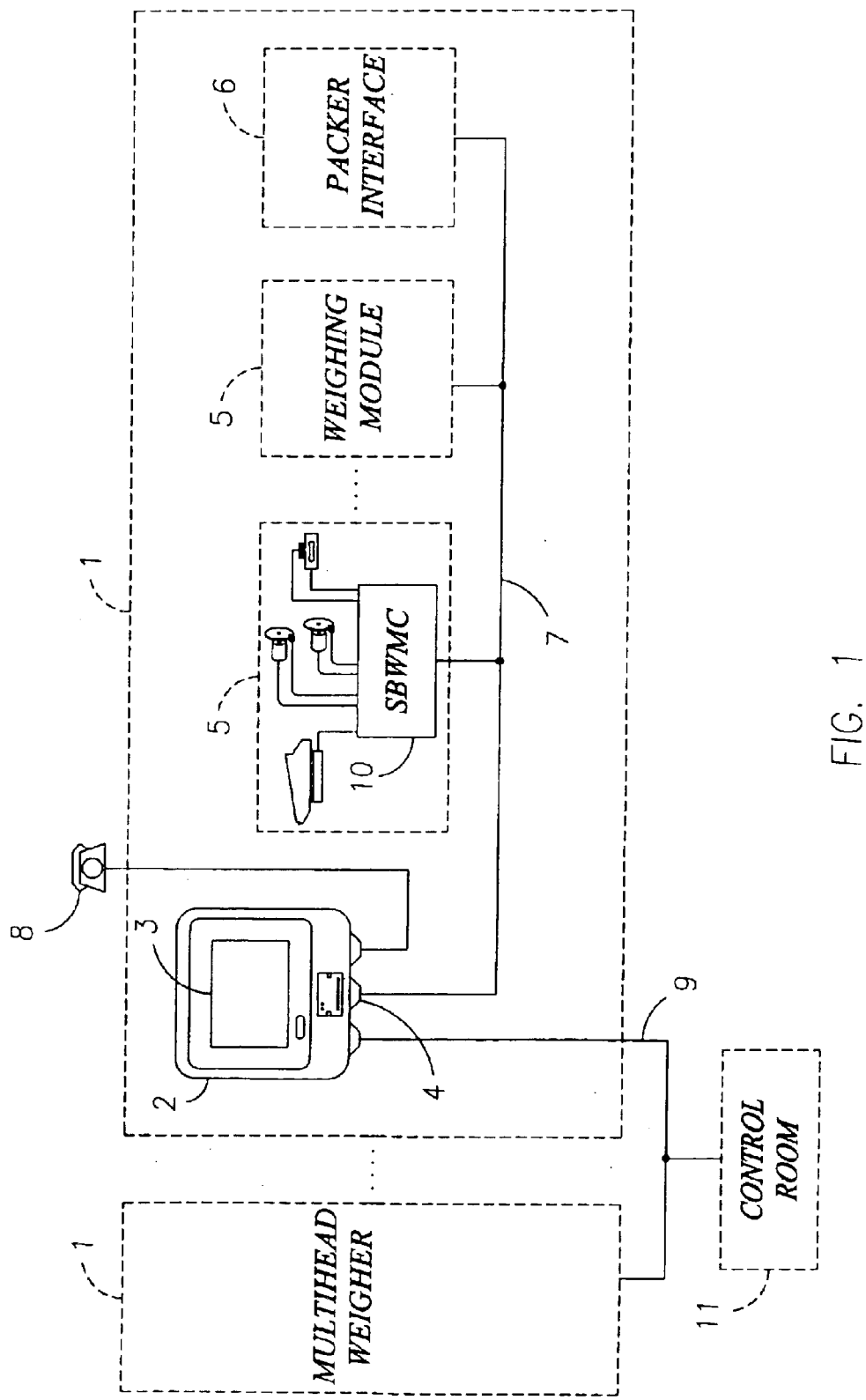
FIG. 1 is a block diagram of a weighing system according to an embodiment of the invention.

According to one aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one macro-command, wherein each of said weighing module controllers controls its weighing module to perform article weighing, discharge and refill operations in response to said at least one macro-command, to thereby reduce the number of commands issued from central control unit to the weighing module controller which would otherwise occur without the macro-command.

Each weighing module controller may be integrated in a single board, and may comprise a finite state machine.

The central control unit may be connected to the plurality of weighing module controllers by a low speed serial network, which may be in a daisy chain configuration.

The central control unit may comprise a general purpose computer such as a personal computer.

The control system may further include a remote control unit, wherein the central control unit is connected to the remote control unit, and wherein the remote control unit controls the issuance of at least one macro-command from the central control unit, so that the central control unit is a slave unit of the remote control unit.

The central control unit may be connected to the remote control unit over a local area network, Internet or low speed serial network.

The central control unit may issue parameter configuration commands to the weighing module controllers, said parameter configuration commands containing information specific to the kinds of articles being weighed, and for use by the weighing module controllers to control article weighing and discharge operations specific for those articles.

The central control unit may further comprise a user interface for enabling input of a desired selection of a kind of article to be weighed, and a memory for storing parameter configuration information specific for different kinds of articles.

Each weighing module may comprise an automatic weight zeroing means for assigning a zero weight to a weighing bucket which has been discharged of its weighed articles, but having article residue which was not discharged.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected over a low speed serial network to the plurality of weighing module controllers for controlling the weighing module controllers by issuing at least one macro-command, wherein each of said weighing module controllers controls its weighing module to perform article weighing, discharge and refill operations in response to said at least one macro-command, to thereby reduce the number of commands issued from central control unit to the weighing module controller which would otherwise occur without the macro-command.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, each weighing module controller consisting essentially of a single board.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a general purpose computer connected to the plurality of weighing module controllers for controlling the weighing module controllers by issuing at least one macro-command, wherein each of said weighing module controllers controls its weighing module to perform article weighing, discharge and refill operations in response to said macro-command, to thereby reduce the number of commands issued from central control unit to the weighing module controller which would otherwise occur without the macro-command.

According to another aspect of the invention a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, wherein each of said weighing module controller controls its weighing module to perform article weighing, discharge and refill operations in response to said at least one command, and a remote control unit, connected to the central control unit, for controlling the issuance of at least one command from the central control unit.

The command issued by the central control unit may include at least one macro-command. The remote control unit may be connected to the central control unit over a local area network, over Internet, or over a low speed serial network.

According to another aspect of the invention a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, wherein each of said weighing module controllers controls its weighing module to perform article weighing, discharge and refill operations in response to said at least one command, and a remote control unit, connected to the central control unit over Internet, for controlling the issuance of at least one command from the central control unit.

According to another aspect of the invention, a control system for a combinatorial weigher system is provided, comprising a plurality of combinatorial weighers, each comprising a plurality of weighing modules, each weighing module receiving articles to be weighed, each weighing module comprising a weighing module controller for controlling article weighing, discharge and refill operations of its respective weighing module, a central control unit connected to the plurality of weighing module controllers for controlling the weighing module controllers by issuing at least one command, and wherein each of said weighing module controllers controls its respective weighing module to perform article weighing, discharge and refill operations in response to said at least one command, and wherein one of said central control units of said plurality of combinatorial weighers is a supervisor control unit which controls the remaining central control units of the plurality.

According to another aspect of the invention, a control system for a combinatorial weigher is provided, comprising a plurality of weighing modules, each weighing module receiving articles to be weighed, each weighing module comprising a weighing module controller for controlling article weighing, discharge and refill operations of its weighing module, a central control unit connected to the plurality of weighing module controllers for controlling the weighing module controllers by issuing at least one command, wherein each of said weighing module controllers controls its weighing module to perform article weighing, discharge and refill operations in response to said at least one command and a remote control unit, connected to the central control unit, for controlling the issuance of at least one macro-command from the central control unit.

According to another aspect of the invention, a control system for a combinatorial weigher is provided, comprising an article weigher for weighing articles and forming articles into batches to be packaged, a feeder for supplying articles to be weighed to the article weigher, a packing station for packing the batches of weighed articles into packages, a packer interface for controlling the supply of articles supplied by the feeder to the article weigher and for controlling delivery of the batches of weighed articles from the article weigher to the packing station, and a central control unit connected to said packer interface through a low speed serial network, said central control unit issuing to said packer interface at least one command indicating the delivery to the packing station of a package to be filled, in response to which command the packer interface controls delivery of a batch of weighed articles to the packing station.

FIG. 1 shows a weighing plant composed of a plurality of multihead weighers 1. The functions of central control unit 2 of each multihead weigher are carried out by a PC or a similar apparatus, realized like a single electronic system as for example a single board computer or similar, which is able to perform the calculus of the combinations, to run a graphical user interface software, to drive a graphic display like a CRT or color LCD panel or the like 3, to handle a touch-screen so that the user can manage the whole machine 1 by simply touching the relative icons or buttons depicted on the graphic display by the graphical user interface software. The central control unit 2 includes non-volatile storage unit for saving programs and data for weighing different kinds of articles, a low speed serial communication port 4 for handling the weighing modules 5 and the packer interface 6 through a low speed serial communication line 7, a modem for the connection to Internet by means of the public telephone network 8 and a LAN interface for the connection to a communication network such as a factory automation communication network 9, which is typically a computer network. Such embodiment is suitable to be contained in a single housing whose dimensions are comparable to the ones of the LCD display or similar due to the compact dimensions of its single board architecture. Each weighing module 5 of the multihead weigher is connected to the central control unit 2 only through the low speed serial communication line 7 and is controlled by a single board weighing module controller (SBWMC) 10 placed near the electromechanical devices that it drives.

Due to the implementation of the central control unit 2 by means of a PC or the like, it is possible to realize an easy and reliable connection of the multihead weigher 1 to a factory automation communication network 9 without any extra hardware interface and the related dedicated software drivers or subroutines for its management, because they are already included in the computer operating system.

As it will be clear to those experienced in the industrial automation field, the possibility to connect the multihead weigher to a factory automation communication network 9 allows its control and its supervision by means of one or more servers connected on the network and located for example in a control room 11. Such an arrangement allows the automatic set-up by the network servers of the multihead weighers, whose central control units 2 are seen as client units. The control of one or more weighers 1 can therefore be done automatically and in an integrated way, in parallel with the management and the control of other industrial equipments and devices connected to the factory automation communication network.

The global control and supervisor system, hereafter called supervisor control system, which is generally located in a control room 11, can send to a multihead weigher 1 a set of parameters, sometimes called a recipe, in order to organize the weigher 1 for the weighing of a particular kind of article or product, such as type of pasta, snack foods, candy pieces, etc. Said recipe contains the weight (e.g. one pound or one kilogram) that the weigher 1 must obtain from the combination of the weights contained in its weighing modules 5, the tolerance band for this weight value, the vibration time of the vibrating channels 12, the weighing speed in weights/min which has to be maintained by the weigher 1 and several other parameters as known by those skilled in the field of combinatorial weighers. The supervisor control system, besides sending the recipe, can enable the mentioned weigher 1 at the automatic working, collect in real time the statistical production data, as for example the current weighed quantity of product, the accuracy grade expressed by means of statistical parameters of the effected weights and detect possible anomalies of the devices that compose the multihead weigher diagnosed by the central control unit 2. It is also possible to perform all the tasks of the central control unit 2 by means of a remote computer connected to the factory communication network 9. In this last case the PC or the like embodied in the central control unit 2 acts as slave unit of the remote computer.

The use of a PC or the like in order to carry out the functions of central control unit allows a simple and reliable connection to Internet of the multihead weigher 1. By means of the modem present in a generic PC conceived for industrial applications or the like, it is possible to connect to Internet a single multihead weigher or a series of multihead weighers 1 interconnected by means of a local area network 9 as reported in FIG. 1. The modalities with which the remote control of a multihead weigher is carried out via Internet are completely equivalent to what has already been discussed for the control realized locally by means of a global control and supervisor system. For example a firm that has its central seat in one country can control a plant situated in another country where there are multihead weighers, by fixing the modalities with which the machine must work and by receiving as feedback the information concerning the production volume discharged by the same. This remote control typology is made possible by the current Internet technology, which allows to effect some permanent and reliable links to the network (24 hours a day) at relatively low costs.

The implementation of the central control unit 2 with a PC or the like provides an efficient remote assistance of the multihead weigher at low costs. In fact, the permanent connection to Internet of the system allows to acquire from the machine detailed information about its real conditions of use and therefore to be able to supply an aimed and effective assistance.

FIG. 1 illustrates a possible configuration of a plant equipped with multihead weighers. There are several configurations that the proposed architecture allows to realize. It is possible to have a single multihead weigher 1 if necessary controlled in a local or remote way by means of a supervisor control system, or, as already mentioned and pointed out in FIG. 1, it is possible to have a series of multihead weighers interconnected each other and controlled in a local or remote way by a supervisor control system. In case of local control it is possible to control a plurality of multihead weighers interconnected by means of a LAN without the necessity of having a global external control system. This is accomplished by assigning to the PC or the like forming part of the central control unit 2 of one of the weighers 1 the task of coordinating the system and therefore by assigning to it the function of a supervisor control unit for the multihead weighers network.

Figure 2:
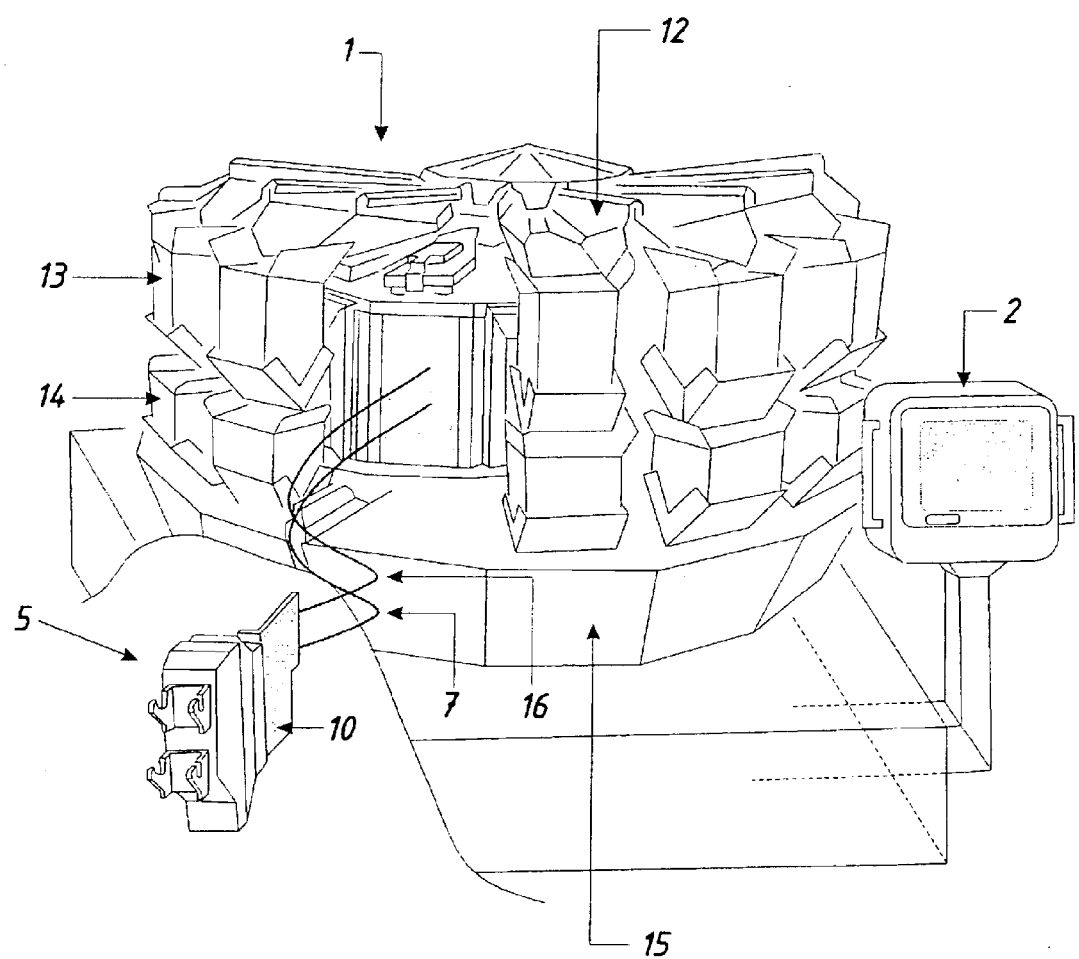
FIG. 2 is a perspective view of an embodiment of the invention showing the central control unit, and a weighing module removed from the weigher, and connected by power supply cable and low speed serial communication line.

A multihead weigher 1 is composed of a plurality of identical weighing modules 5, placed generally in circular configuration as pointed out in FIG. 2. The physical structure of the multihead weigher 1 points out the concept of modularity on which the architecture of this weighing system is based. Starting from the external mechanical bodies such as the vibrating channels 12, the feeding buckets 13, the weighing buckets 14 and the funnel 15 by means of which the weighed product is transferred for example to the underlying packaging machine, it is noted that each element constitutes a different module, easy to be inserted and taken off from the machine body. With the same philosophy the multihead weigher control system has been conceived, physically separated in the central control unit dislocated in a single housing 2, in the weighing modules 5, each equipped with a single board weighing module controller 10, and with a packer interface 6 located inside the multihead weigher and therefore not shown in FIG. 2. Each weighing module can be inserted in the multihead weigher body in a radial way and needs only two connection lines, the low speed serial communication line 7 and the power supply cable 16. A weighing module 5, when it is being inserted in the multihead weigher 1, is automatically recognized by the central control unit 2 and therefore becomes immediately operative without the necessity of elaborate configuration procedures. In the same way, when a weighing module 5 is extracted from the multihead weigher or is simply disabled via software, the central control unit 2 recognizes the new situation and allows the working of the multihead weigher 1 with one fewer weighing module 5. While only one weighing module 5 has been discussed as being added or removed, it should be understood that more than one module can be added or removed.

Figure 3:
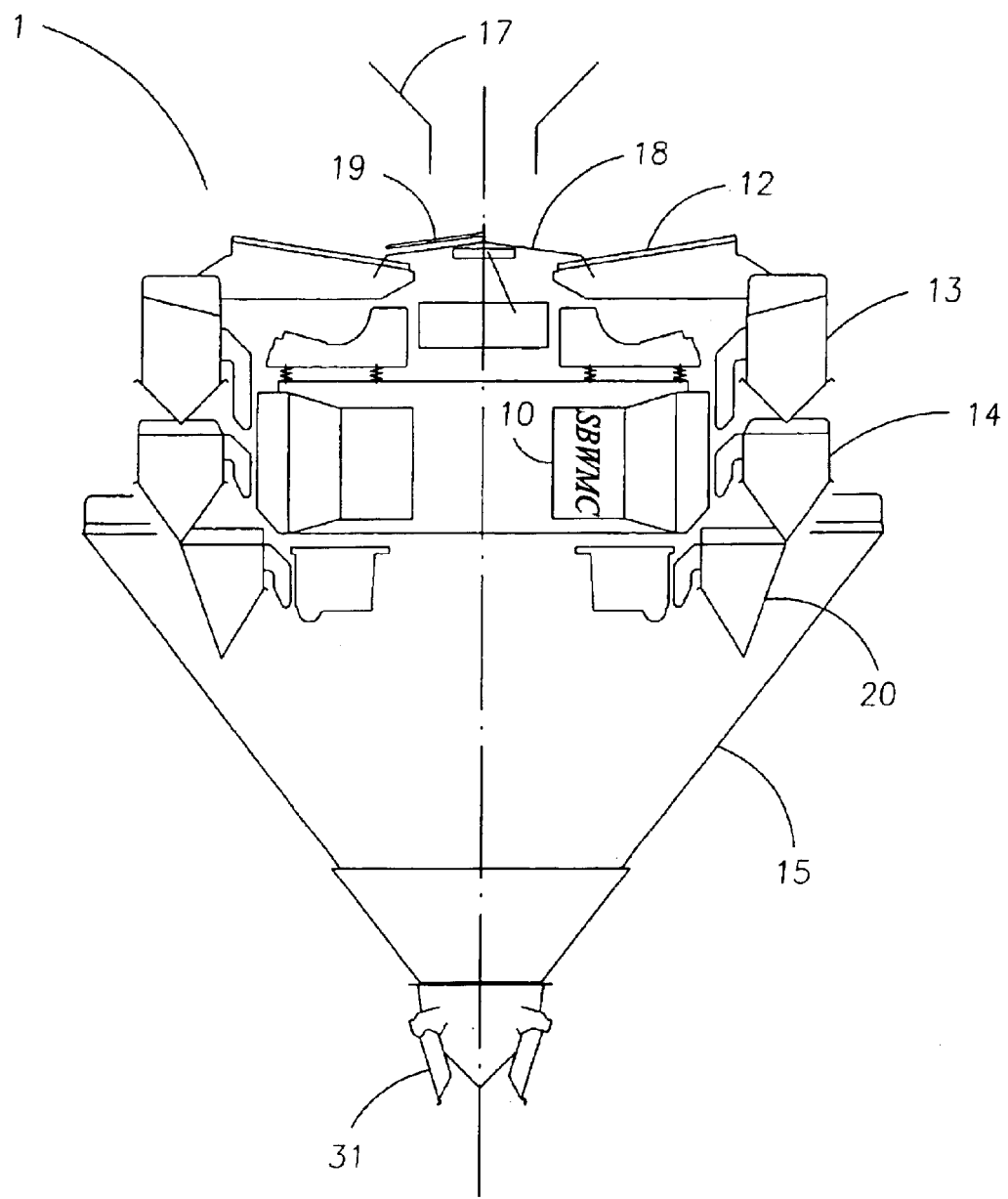
FIG. 3 is an elevational view, in cross-section, of the weigher of FIG. 2.

FIG. 3 shows a section of the multihead weigher 1 in which the mechanical bodies are well visible. The multihead weigher is fed in the center with the product to be weighed by means of a funnel or feeding cone 17. The product, dispersed in radial direction by a central feeder, typically composed of a vibrating cone 18 or of a rotating blade 19, flows into the vibrating channels 12 and from here it proceeds towards the weighing modules. As it is possible to see in detail in FIG. 4, each vibrating channel 12 fills with product the feeding bucket 13 of a weighing module. From the feeding bucket 13 the product passes to the corresponding weighing bucket 14. Here the content of the weighing bucket is weighed and its value is transmitted by the single board weighing module controller 10 to the central control unit 2 for the calculus of the combinations and for the selection of the combination of which weighing buckets are needed to reach or come closest to the target weight. The weighed articles can also be deposited in an optional memory bucket 20 visible in FIG. 3, whose function is known to those skilled in combinatorial weighers.

Figure 5:
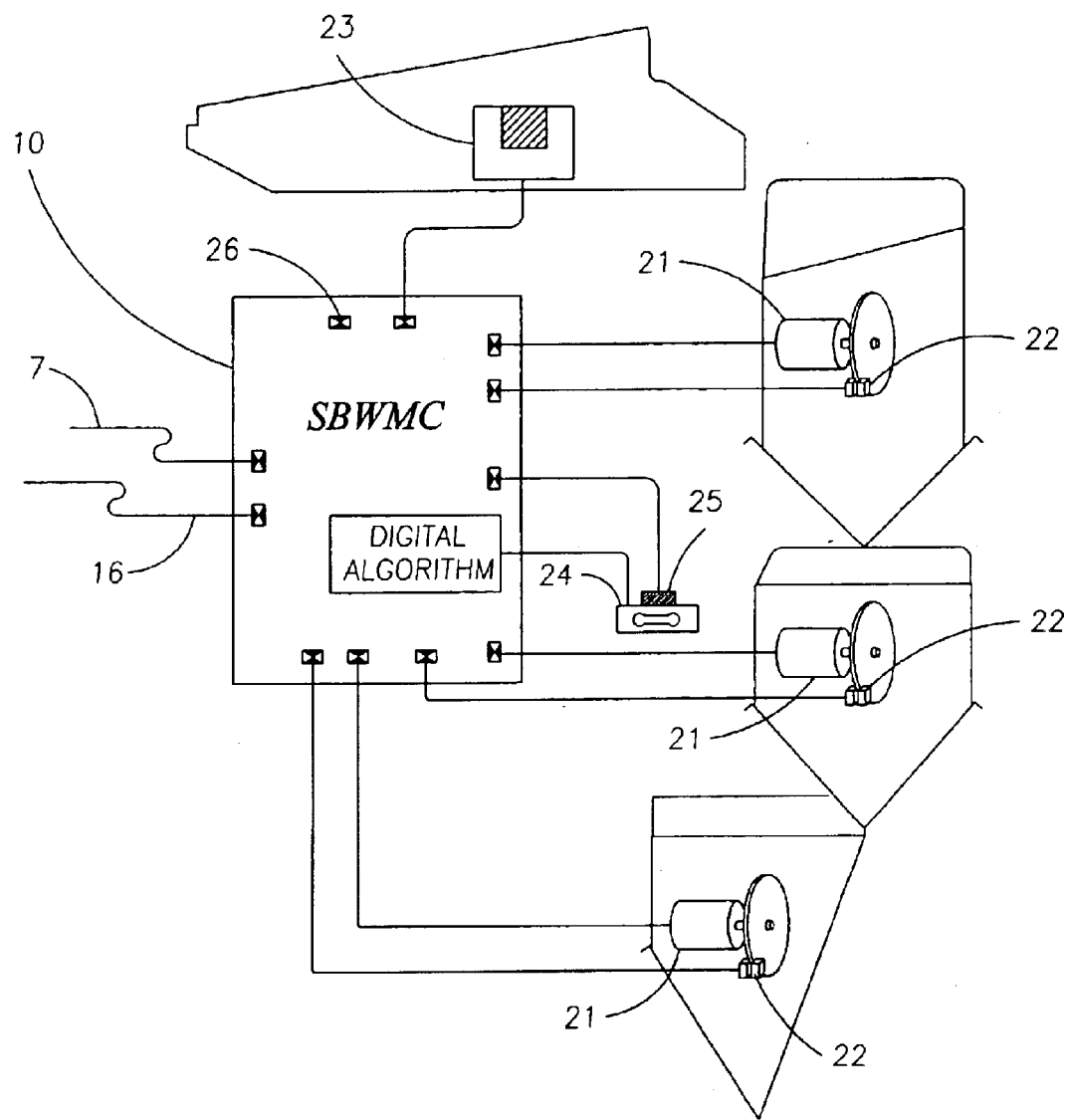
FIG. 5 is a schematic view of a single board weighing module controller, and components controlled thereby.

Each weighing module 5 is equipped with its own single board weighing module controller 10 able to drive all the electromechanical devices necessary for its working. FIG. 5 shows in detail all the devices directly driven and controlled by a single board weighing module controller 10: an electrical motor 21 and the relative zero position sensor 22 for each bucket that equips the weighing module, an electromagnet 23 for the driving of the vibrating channel, a load cell 24 mechanically coupled to the weighing bucket for the measurement of the weight contained in the bucket, a solid state temperature sensor 25 for the measurement of the temperature of the load cell body, a low speed serial communication port for the connection to a low speed serial network 7 which connects the central control unit 2 to all the weighing modules 5 and an auxiliary serial port 26 for post production tests and future expansions. As already pointed out in FIG. 2, the only wirings that depart from a weighing module are the power supply cable 16 for the single board weighing module controller and the low speed serial network cable 7.

The single board weighing module controller 10 controls all of the above mentioned electromechanical devices without involving the central control unit 2 in its operations. The single board weighing module controller 10 is able to synthesize a current waveform to feed the electromagnet 23 of its own vibrating channel 12, whose characteristic electrical parameters such as frequency, duty cycle and current intensity can be adjusted with continuous modality on wide ranges, and it is besides immune to possible accidental short-circuits present in the electromagnet 23. The single board weighing module controller 10 is able to check automatically the average value of the product quantity present in the weighing bucket without requesting the intervention of the central control unit 2. Such system is based on a feedback control algorithm, said vibrating channel automatic control, which acts on the time and on the intensity of the vibration by proper self adjustment of the electrical parameters of the current wave which feed the electromagnet 23 of the vibrating channel 2 in order to adjust the average value of the weights of the products contained in the weighing bucket.

A single board weighing module controller 10 is able to adjust the speed of the electrical motors and to operate with different speed values for the opening and the closing phase of each bucket the weighing module 5 has. A single board weighing module controller 10 is able to directly acquire the very low level differential electrical signal (weight signal) at the output of a load cell 24 and to process it by means of digital techniques for fast suppression of oscillatory components induced by the movements of mechanical devices and by articles falling and so for obtaining the DC component of the differential signal which corresponds to the weight of the articles contained in the weighing bucket. Such a process is performed totally by the single board weighing module controller 10 without involving any external device or communications with external units.

As used herein, the term "single board" means a single printed circuit board carrying all the components for driving all of the electromechanical devices of the weighing module and for acquiring and processing the weight signal from the load cell, with all interconnections included on the printed circuit and with the only connections off the board being to receive power, connections for serial network, and to the electromechanical devices such as shown in FIG. 5.

A single board could also include one or more piggy back boards connected and mounted on (usually removably) to the main single board using electrical socket connectors such as pin strip connectors, without any substantial wires.

The working environment of a multihead weigher can be characterized by strong thermal gradients accompanied by working temperatures lower than 0° Celsius grades for the weighing of frozen products or higher than 50° Celsius grades if the weigher is dislocated near heat sources such as, for example, an industrial oven. The single board weighing module controller 10 is able to detect the temperature of the load cell 24 by acquiring the electrical signal coming out from the solid state temperature sensor 25, thermally coupled with this last one. The single board weighing module controller 10 can compensate the conversion gain of the load cell 24 by means of a look-up table, or other suitable algorithm, in case the working temperature of this last one exceeds the manufacturer fixed limits. Such a process is performed totally by the single board weighing module controller 10 without involving any external device or communications with external units.

The architecture represented in FIG. 1 includes also a packer interface 6 connected to the central control unit only by means of the low speed serial network 7. The characteristics of the packer interface will be described with reference to FIG. 6. The packer interface 6 is in the form of a single board whose function is to control the interface signals with the equipment connected after the multihead weigher 1 by means of the digital input and output stages, respectively 27 and 28, to drive the central feeder devices such as for example 18 or 19, to drive one or more electrical motors 29 for the control of auxiliary devices such as for example a shutter 30 mounted at the exit of the transfer cone 15, to acquire some product minimum and maximum level signals such as for example those coming out from a couple of photocells 31 in order to check as known by those skilled in this art the quantity of product flowing in the weigher. The last issue could also be obtained by means of a load cell 32 mechanically coupled to the central feeder 18.

The single board packer interface 6 is able to directly acquire the very low level differential electrical signal at the output of a load cell 32 and to process it by means of digital techniques for fast suppression of oscillatory components for obtaining the DC component of the differential signal which corresponds to the weight of the articles which burden the central feeder. Such a process is performed totally by the single board packer interface 6 without involving any external device or communications with external units.

The single board packer interface 6 is able to synthesize a current waveform in order to feed the electromagnet 33 of the central vibrating feeder 18 whose characteristic electrical parameters such as frequency, duty cycle and current intensity can be adjusted with continuous modality on wide ranges and it is besides immune to possible accidental short-circuits present on the electromagnet 33.

Every time the central control unit 2 delivers a discharge of articles, for example to a packer, it sends an appropriate macro-command by means of the low-speed serial network 7 to the single board packer interface 6. Such a macro-command will cause the single board packer interface 6 to handle the digital I/O signals of the digital I/O sections 27 and 28 in the appropriate way, for delivering the discharged weight to the packer, to open and close the auxiliary shutter 30, if it is present, to switch on the central vibrating feeder 18, to control the rotating blade 19, if it is present, and to manage other digitally or electrical motor driven auxiliary devices not shown in FIG. 6. Such a process, triggered by a single macro-command issued by the central control unit 2, is performed totally by the single board packer interface 6 without involving any external device or communications with external units.

If the shutter 30 is employed by the weigher, the single board packer interface 6 in response to handshake discharging signals, exchanged for example with a packer on the digital I/O sections 27 and 28, decides itself the opening and closing of the shutter 30 for delivering to the packer the previous held combination of articles. After this operation is a task of the single board packer interface 6 to request to the central control unit 2 by means of the low speed serial network 7 a new combination of articles for refilling the shutter 30.

Figure 6:
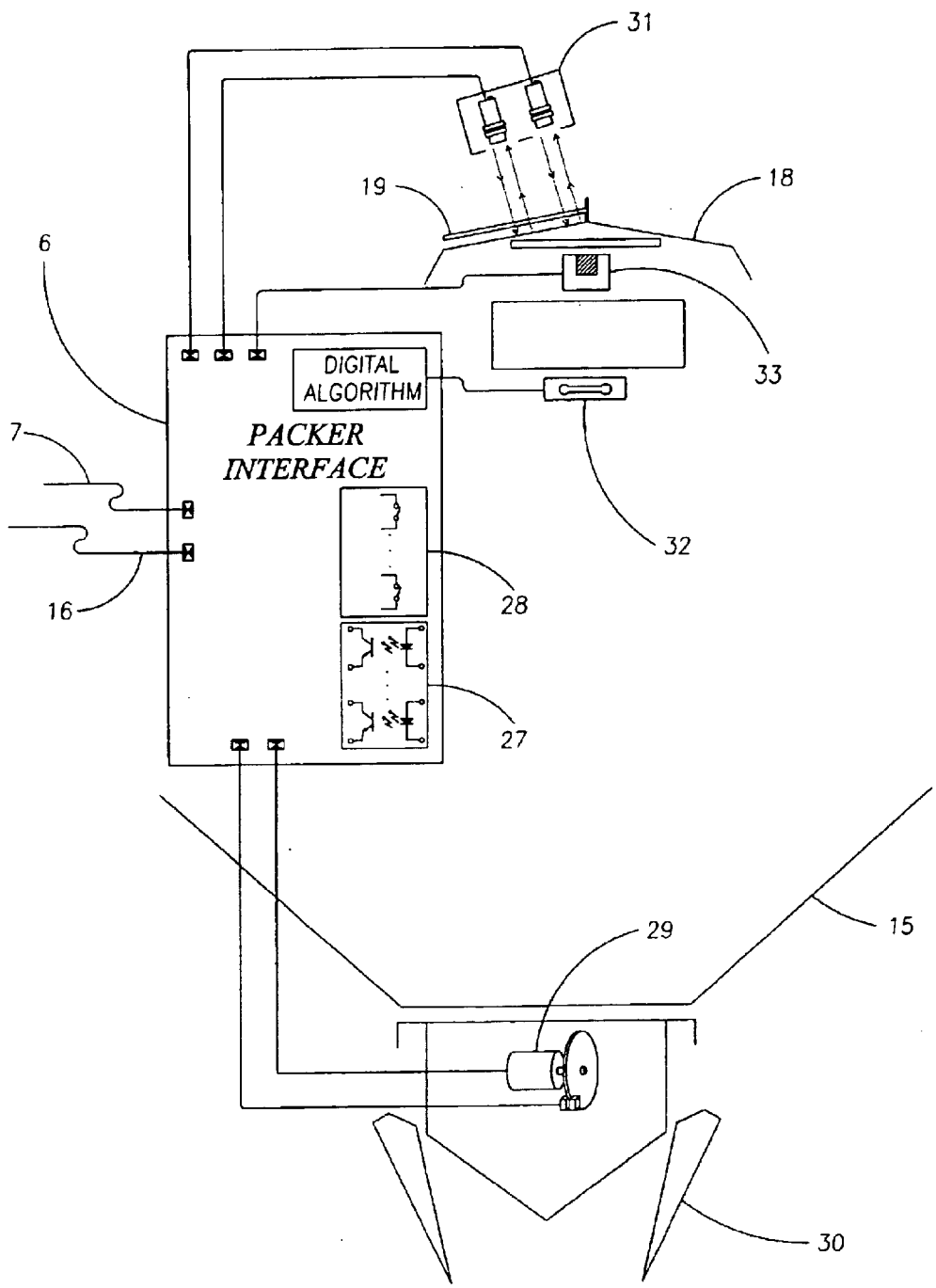
FIG. 6 is schematic view of a single board packer interface, and all components associated therewith.

The auxiliary rotating blade 19 is driven by an electrical motor, not shown in FIG. 6, which is controlled by a. digital switch belonging to the digital output sections 28. The auxiliary shutter 30 may be driven by an electrical motor, but it can be also driven by a pneumatic device controlled by a digital switch belonging to the digital output section 28.

The external feeding system which might be a vibrating channel or other appropriate equipment, could be directly driven by the single board packer interface 6 by means of an auxiliary electromagnet driving output (not shown in FIG. 6) with the same features of the main one employed for the central vibrating feeder 18, or by means of the digital I/O sections 27 and 28 in the case that the external feeding system accepts digital control signals. In both cases the control actions taken by the single board packer interface 6 are based on signals coming from the photocells 31 and/or from the load cell 32. The control of the external feeding system is performed by the single board packer interface 6 as a parallel process superimposed to the previous mentioned activities.

The length of the time interval in which the shutter 30 remains open, the length of the time interval in which the central vibrating feeder 18 remains on, the minimum and maximum weight values with which to compare the values acquired from the load cell 32 for the control of the external feeding system, the electrical parameters which characterize the current wave that feeds the electromagnet 33, are all configuration parameters of the single board packer interface 6 that are set by the central control unit 2 by issuing specific. commands on the low speed serial network 7 directed to the single board packer interface 6.

The multihead weigher 1 is characterized by two working modalities: the automatic functioning or automatic modality, and the manual functioning or manual modality. For automatic functioning it is meant that the multihead weigher drives its electromechanical bodies in order to discharge rhythmically into the transfer cone a quantity of articles whose weight is in a predefined range. For manual functioning it is meant that the machine is not operative according to the sense defined in the previous condition, but it is instead possible to operate manually all the components of the single weighing modules, such as buckets 13–14 and vibrating channels 12, or acquire the weights detected by the load cell 24, by acting opportunely on the touch-screen graphic interface of the central control unit 2. In the manual working modality it is possible to send to the weighing modules the parameters necessary for the automatic working phase as, for example, to set the characteristic parameters of the vibrating channels 12, to enable or disable the vibrating channel automatic control, to define the accuracy of the weight values which will be obtained by the digital processing of the signals coming out from the load cells 24, to set the speed values of the electrical motors 21 and so on. The transmission of the configuration parameters to the weighing modules 5 takes place by sending suitable parameter configuration commands by the central control unit 2 to each weighing module 5, using the low-speed serial network 7. The values of the parameters may be different for different weighing modules. Such configuration commands are transmitted in manual working after some operative conditions changes set by the user on the touch-screen, for example the selection of a new recipe, or after the checking of the central control unit 2 by the supervisor control system in case the multihead weigher 1 is connected to the factory automation communication network 9 as represented in FIG. 1.

It has been decided to set the weighing modules 5 when the multihead weigher 1 is in manual functioning in order to simplify the control of the architecture of FIG. 1 when the automatic functioning is in progress. This convention is justified by the fact that generally, for obtaining a very good performance from the multihead weigher 1, it is not necessary to change the weighing modules configuration parameters during the automatic functioning. The transmission of the configuration parameters of the weighing modules, when the multihead weigher 1 is in manual modality, is only a possible use of the architecture depicted in FIG. 1. Nothing is an obstacle in case it is decided to set again, also partially, the weighing modules engaging the low-speed serial network 7 when the automatic functioning is in progress. It is thus possible to reset all or part of the parameters in the automatic mode.

With the previous convention it is possible to control in automatic functioning the whole architecture visible in FIG. 1 only by means of two commands (i.e. the "SEND_NET_WEIGHT" command, and the "DISCHARGE_AND_REFILL" macro-command) issued from the central control unit 2 and directed to the weighing modules 5. This feature is made possible by the fact that a generic single board weighing module controller 10 is structured as a finite state machine, sometimes called automaton. Such arrangement permits the execution of a complex task composed by a sequence of operations, a part of which must be executed as parallel processes by the single board weighing module controller 10 in reply to a single macro-command which plays the role of an exogenous input for the automaton.

As used herein, the term "macro-command" means a command from the central control unit 2 to the single board weighing module controller 10 which causes the initiation of one or more tasks of weighing, discharging and refilling in response to that single macro-command, which task includes subtasks which will be performed and controlled by the single board weighing module controller 10 to complete the task.

In a specific example, the term macro-command means an instruction code, composed by an instruction byte and an optional data field of few data bytes, which is interpreted by the automaton as an exogenous input. Such input causes the state variable of the automaton to cycle along a predefined state graph following a track which depends from the value of the state variable at the time that the macro-command was received and from the configuration parameters. Corresponding to the evolution of the state variable initiated by the exogenous input (the macro-command), the automaton is able to manage operations directly related to the values of the state variable, like moving the feeding and weighing buckets, starting the vibrating channel, processing the weight signal from the load cell and so on. The receiving of a macro-command by a generic automaton results in a set of well defined operations performed by the single board weighing module controller 10, part in sequence, and part as parallel processes, which could be referenced as a single macro-operation.

The mnemonic names of the three main commands which are issued by the central control unit 2 in automatic functioning are: "SEND_NET_WEIGHT", "DISCHARGE_AND_REFILL" and "REFILL", the last two of which are macro-commands.

As used herein, the term "command" means control information, operating information or the like, including instructions, to the single board weighing module controller 10, which causes the single board weighing module controller 10 to respond by providing information in return or by initiating one or more tasks. The term "command" includes "macro-command".

After the command SEND_NET_WEIGHT is sent by the central control unit 2 and is received by a weighing module 5, the respective single board weighing module controller 10 for that weighing module 5 answers simply by sending to the central control unit 2 the net weight value contained in the weighing bucket 14. The central control unit 2 receives the net weights from the weighing modules 5 and calculates a proper combination of weighing modules needed to best achieve the target weight. If the single board packer interface 6 signals to the central control unit 2 the need of a discharge of a new batch of articles, the central control unit 2 issues the macro-command DISCHARGE_AND_REFILL to each selected weighing module 5 in the proper combination, which macro-command represents an exogenous input for the automaton that causes the starting of the cycle underneath explained in detail without involving any external device or communications with external units.

Figure 4:
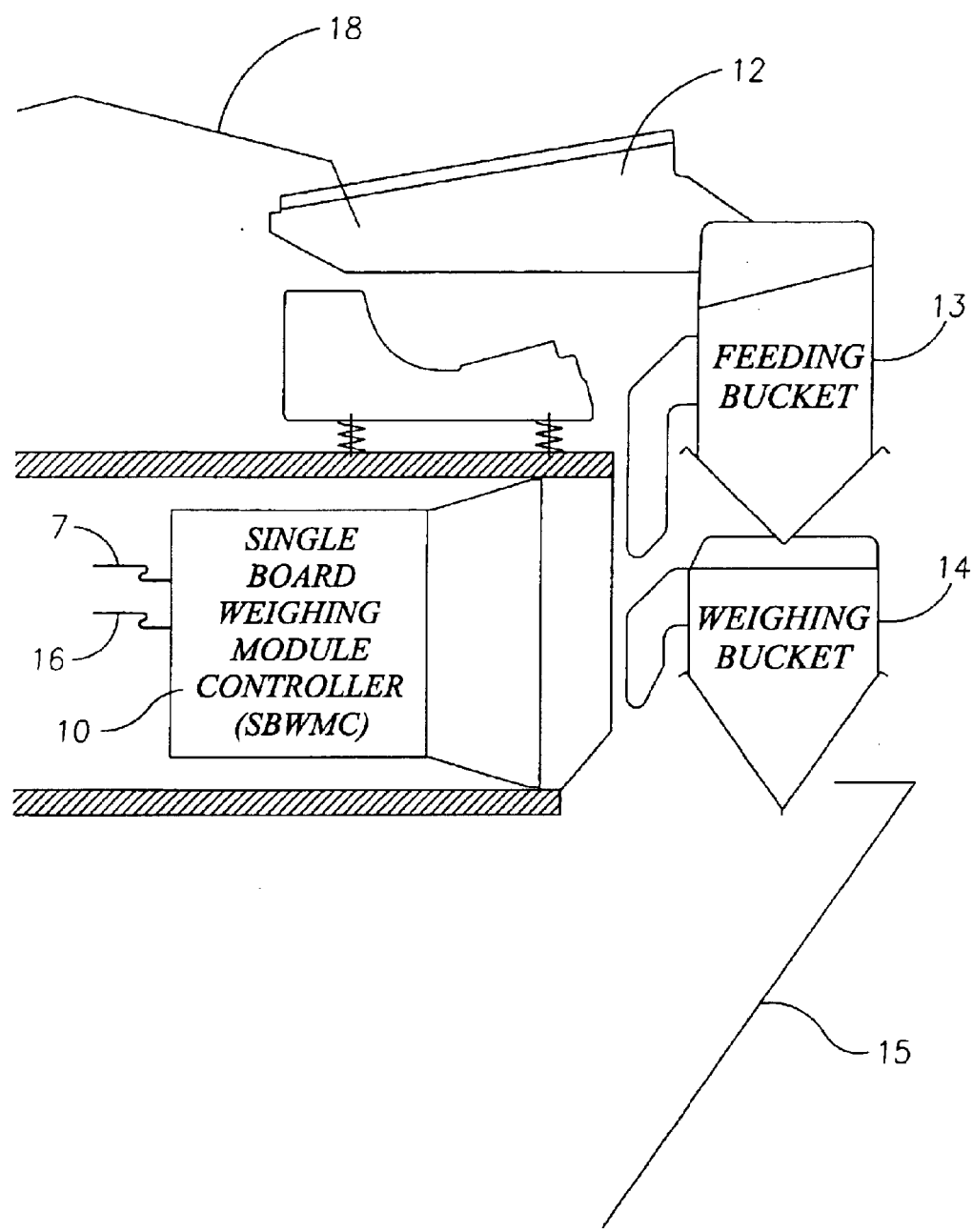
FIG. 4 is a schematic structural view of the mechanical bodies of a weighing module.

With reference to FIG. 4, a similar cycle begins with the weighing bucket 14 opening for the discharge of the product contained in it into the transfer cone 15. At the end of the weighing bucket 14 opening phase, the automaton starts the following closing of the same weighing bucket. After a certain time interval from the weighing bucket 14 opening, there is the start of the feeding bucket 13 opening phase for the weighing bucket 14 refilling: the weighing bucket 14 moving phase and the feeding bucket 13 opening phase overlap at least partly and the reciprocal delay with which the said feeding bucket delay time begins is adjustable by a suitable command in manual modality. It is generally convenient to at least partly overlap the two previous phases in order to approach the ideal condition in which, immediately after the weighing bucket 14 closing, the new quantity of articles to be weighed, delivered by the feeding bucket 13, is already contained in the weighing bucket 14. A similar operative condition reduces the time necessary for the weighing bucket filling by minimizing the time taken by the single board weighing module controller 10 for detecting the new stable weight value with consequent increase of the maximum speed achievable by the multihead weigher 1, expressed in weights/minute. The feeding bucket delay time can be set with such values that the beginning of the feeding bucket 13 opening takes place when the weighing bucket 14 is already closed.

The weighing bucket 14 closing ends with the reading by the automaton of the zero position sensor 22 related to such bucket, which establishes if the motor angular position corresponds indeed to the condition of closed bucket. In case the sensor signals that the weighing bucket is not in the condition of bucket closed, the automaton executes on his own a zero search procedure for the repositioning of the weighing bucket motor. Such procedure is included in the state graph of the automaton and so it does not interfere with the correct sequence of the remaining operations.

When the weighing bucket 14 closing takes place, the feeding bucket 13 could be still closed, or could have already started its opening, or could have already started its closing, or could have completed its closing phase. The feeding bucket 13 status, when the weighing bucket 14 is closed, depends in fact besides on the feeding bucket delay time also on the speed values assigned independently to the opening and closing speed of each buckets by means of suitable parameter configuration commands transmitted during the manual functioning condition.

At the end of the feeding bucket 13 opening phase, the automaton begins the following closing of the same feeding bucket. The closing start of the previously opened feeding bucket 13 causes, after a certain time interval said vibrating channel start delay, the switching on of the vibrating channel 12 for refilling the feeding bucket 13: the moving phase of the feeding bucket 13 and the phase in which the vibrating channel 12 is switched on overlap at least partly and the reciprocal delay with which the said vibrating channel start delay begins is adjustable by a suitable parameter configuration command in manual modality.

Generally it is convenient to effect the switching on of the vibrating channel 12 when the feeding bucket 13 has not closed yet. In this way it is possible to approach the ideal condition in which immediately after the closing of the feeding bucket 13, the new quantity of articles that are going to refill it is already partly or totally contained in the feeding bucket 13. Such an operative condition minimizes the time necessary for the filling of the feeding bucket 13 increasing in this way the maximum weighing speed reachable by the multihead weigher 1, expressed in weights/min. The vibrating channel 12 start delay can be set at such values that the beginning of the vibrating channel 12 switching on takes place when the feeding bucket 13 is already closed. The switching off of the vibrating channel 12 is effected by the automaton at the end of the switching on time interval, whose length is adjustable by a suitable parameter configuration command in manual modality.

As for the weighing bucket 14, the closing of the feeding bucket 13 finishes with the reading by the automaton of the zero position sensor 22 relative to such bucket, which establishes if the angular position of the motor corresponds effectively to the condition of bucket closed. In case the sensor signals that the feeding bucket 13 is not in the condition of bucket closed, the automaton executes on his own a zero search procedure for the repositioning of the feeding bucket motor. Such procedure is included in the state graph of the automaton and so it does not interfere with the correct sequence of the remaining operations.

After the weighing bucket 14 has been closed, an appropriate time interval later the automaton carries out the elaboration by means of digital techniques of the signal coming out from the load cell 24 in order to detect the DC component, from which the weight of the articles contained in the weighing bucket 14 is obtained. Such elaboration started by the automaton is carried out in parallel to the activities of the single board weighing module controller 10 which are still pending when the digital signal processing of the load cell signal begins. In fact it could be possible that, as previously stated, the closing of the feeding bucket 13 would be in progress and/or the vibrating channel 12 is still functioning after the weighing bucket 14 has been closed.

It is the same automaton that will complete all pending processes including the one concerning the identification of the net weight of the product transferred during the filling process of the weighing bucket 14 as above described. When the new value of the net weight contained in the weighing bucket 14 is identified, the automaton has completed its cycle and it is ready to effect a new one in reply to the exogenous input DISCHARGE_AND_REFILL after communicating the new value of net weight to the central control unit 2.

As far as the REFILL macro-command is concerned, when this macro-command is transmitted by the central control unit 2 to a generic weighing module 5, it is interpreted by the corresponding automaton as an exogenous input which causes the starting of a cycle equivalent to the previous explained, related to the macro-command DISCHARGE_AND_REFILL, with the exception that the weighing bucket 14 remains closed, that is, it is not discharged. By issuing this macro-command the central control unit 2 is able to manage non-typical situations, one example is when the weight of the articles contained in the weighing bucket 14 of a generic weighing module 5 is much lower than the target weight value of the current recipe.

It is clear that such an automaton, able to manage all the electromechanical components of a weighing module 14, could be implemented also in other forms, for example like a Petri net, instead of a finite state machine. Such possibility is considered to be an equivalent approach, in the sense that both cases allow the use of a low-speed serial network 7 in the architecture due to the fact that the discharge and refill cycle just explained is totally carried out by an automatic algorithm embodied in the single board weighing module controller 10 which does not involve any communications with external units.

The absence of intensive communication traffic on the serial network 7 is due to the fact that the time duration of the discharge and refill processes for a single weighing module 5, which is mainly dependent on the configuration parameters, is of hundreds of milliseconds as order of magnitude. It is such a duration that must separate the time instants in which the central control unit 2 sends, to the same weighing module 5, first the macro-command DISCHARGE_AND_REFILL and then the command SEND_NET_WEIGHT. Even if this network communication activity is multiplied by the number of the weighing modules 5 belonging to the multihead weigher 1, the overall information exchanged over a time unit among the weighing modules 5 and the central control unit 2 by means of the low serial network 7 is low. As order of magnitude, the typical speed of the serial network 7 adopted ranges from about $10^3$ (e.g. 1,200, 2,400 or 4,800) baud to $10^4$ (e.g., 9,600 or 19,200) baud, higher bit rate values could be employed but are not necessary for very high speed operation of the multihead weigher 1, in terms of weights/minute. With the arrangement according to the invention, the yield of the weigher in weights/minute has exceeded 200 using 16 heads.

Physically the disposition of the electromechanical bodies belonging to a weighing module 5 is pre-arranged, which pre-arrangement also dictates the logic sequence of the operations that the automaton must effect in order to carry out the discharge and the filling of a weighing bucket 14. Once this sequence and the configuration parameters that characterize it, such as for example the speed of the motors, the feeding bucket delay time, the vibrating channel start delay etc. are known, the automaton is able to realize all the possible working modalities of a weighing module 5 by modifying opportunely the value of the characteristic configuration parameters. The automaton can be implemented like software embodied in the single board weighing module controller 10.

In this case one need not to perform any upgrading by means of the transmission of any new software release by the central control unit 2 to all the weighing modules 5. The logic sequence of the operations are dictated by the pre-arrangement of the electromechanical bodies, so that all the possible meaningful operations of a weighing module 5 can be realized by the automaton with a proper choice of the configuration parameters. The only possible changes contemplated are simple modification of the configuration parameters of the same automaton. An upgrade of the software of the single board weighing module controller by means of the serial network 7 would increase considerably the information exchange among the weighing modules 5 and the central control unit 2. As this feature is not necessary for all the above mentioned reasons, the low speed serial network 7 is the well, and maybe even the best, suited solution for the management of the system 1.

The multihead weigher can be used also as piece-counter. For this purpose it is sufficient to establish a correlation between the weight of a single piece and the overall weight of the number of pieces to be counted. On the basis of this simple analysis, a recipe completely analogous to the ones already mentioned is set and the multihead weigher 1 can work as piece-counter with a very high speed in terms of pieces/minute or batches of pieces/minute.

One preferred embodiment of the present invention has been described based on the drawings. As those skilled in the art will recognize, variations and modifications may be made in the preferred embodiment and still fulfill the purpose of the invention. They should be construed as being included therein.

We claim:

1. A control system for a combinatorial weigher, comprising:

a plurality of weighing modules, each weighing module receiving articles to be weighed, each weighing module comprising a weighing module controller for directly driving and controlling article weighing, discharge and refill operations of its weighing module, each weighing module controller consisting essentially of a single board, said single board having a load cell coupled to a weighing bucket for measuring of the weight of articles in the bucket and for producing a weight signal, wherein the processing of the weight signal is performed totally by the weighing module controller without involving any external device or communications with external units.

2. A control system for a combinatorial weigher, comprising:

a plurality of weighing modules, each weighing module receiving articles to be weighed, each weighing module comprising a weighing module controller for controlling article weighing, discharge and refill operations of its weighing module;

a general purpose computer connected to the plurality of weighing module controllers for controlling the weighing module controllers by issuing at least one macro-command; and wherein each of said weighing module controllers controlling its respective weighing module to perform article weighing, discharge and refill operations in response to said macro-command, to thereby reduce the number of commands issued from central control unit to the weighing module controller which would otherwise occur without the macro-command.

* * * * *